United States Patent [19]

Okazoe et al.

[11] Patent Number: 5,665,129
[45] Date of Patent: Sep. 9, 1997

[54] WET FLUE-GAS DSULFURIZATION SYSTEM

[75] Inventors: Kiyoshi Okazoe; Toyoshi Nakagawa, both of Tokyo; Toru Takashina, Hiroshima, all of Japan

[73] Assignee: Mitsubishi Jukogyo Kabushiki Kaisha, Tokyo, Japan

[21] Appl. No.: 523,826

[22] Filed: Sep. 6, 1995

[30] Foreign Application Priority Data

Oct. 12, 1994 [JP] Japan .................................. 6-245855

[51] Int. Cl.$^6$ .................................................. B01D 47/14
[52] U.S. Cl. ............................... 55/257.1; 55/228; 55/229; 55/259
[58] Field of Search .................................. 55/257.1, 259, 55/248, 250, 234, 228, 229, 242; 423/243.01, 243.08

[56] References Cited

U.S. PATENT DOCUMENTS

| 3,006,436 | 10/1961 | Starbuck et al. | 55/257.1 X |
| 3,500,615 | 3/1970 | Meek | 55/257.1 X |
| 3,648,440 | 3/1972 | Egan | 55/257.1 X |
| 3,767,176 | 10/1973 | Engalitcheff, Jr. et al. | 55/257.1 X |
| 4,366,132 | 12/1982 | Holter et al. | 55/250 X |

FOREIGN PATENT DOCUMENTS

| 62-130719 | 8/1987 | Japan . |
| 2246525 | 2/1992 | United Kingdom . |
| WO82/02038 | 6/1982 | WIPO . |
| WO87/03215 | 6/1987 | WIPO . |
| WO93/08899 | 5/1993 | WIPO . |

*Primary Examiner*—Richard L. Chiesa
*Attorney, Agent, or Firm*—Jacobson, Price, Holman & Stern, PLLC

[57] ABSTRACT

A wet flue-gas desulfurization system which effectively reduces the mist concentration in the treated gas at its outlet. The system includes an absorption column, formed with a tank at the bottom which is supplied with an absorbent slurry and a circulating pump for forcing the slurry upwardly from the tank into the flue gas inlet at the top of the column for contact with flue gas. Sulfur dioxide, for example, is removed from the flue gas, being introduced in the flue gas inlet, by absorption with the absorbent slurry. The treated gas, free of sulfur dioxide, is discharged through a gas-outlet duct formed to rise integrally from the top of an end part of the tank. For reducing the mist concentration a mist eliminator is provided and is held upright, as a vertical partition, across the riser of the duct, with the lower end of the eliminator being extended partly into the bath of the absorbent slurry inside the tank.

4 Claims, 3 Drawing Sheets

WET FLUE-GAS DSULFURIZATION SYSTEM

This invention relates to a wet flue-gas desulfurization system which can effectively reduce the mist concentration in the treated gas at its outlet.

BACKGROUND OF THE INVENTION

Flue-gas desulfurization facilities of the wet type in which sulfur dioxide is removed from flue gases by means of an absorbent slurry have recently come into wide-spread use. In those systems the absorbent slurry is injected into the path through which the flue gas passes so as to ensure efficient contact between the slurry and the gas. The injection produces a mist of the absorbent slurry, which must eventually be eliminated.

FIG. 2 illustrates a typical arrangement (of essential components only) of the conventional wet flue-gas desulfurization systems. It comprises an absorption column 1, a tank 2 formed at the bottom of the absorption column 1 and which is supplied with an absorbent slurry S, for example, of limestone through a slurry supply line not shown, a circulating pump 3 for forcing the slurry upwardly from the tank 2 into a flue gas inlet 1a at the top of the absorption column where the slurry comes in contact with the flue gas, an agitating bar 7 supported by a rotating shaft 5 hanging from the ceiling 4 of the tank 2 and which is driven by a motor 6 to turn horizontally in the bath of slurry S, a gas-outlet duct 8 formed to rise integrally from the top of an end part of the tank 2 and extend sideways, and a mist eliminator 9 installed like a partition across the duct body 8a of the gas-outlet duct 8.

In the system, flue gas A to be treated is introduced into the absorption column 1 at the flue gas inlet 1a, where it is contacted with the absorbent slurry S being sprayed from a header pipe 10. In this manner, the crude flue gas A is freed from sulfur dioxide by absorption and is discharged as a clean treated gas B from the gas-outlet duct 8. The absorbent slurry S that has been sprayed out of the header pipe 10 flows down, while absorbing sulfur dioxide from the flue gas, by way of a bed of packing material 11. The absorbent slurry S that has fallen into the tank 2 is stirred by the agitating bar 7 and is oxidized through contact with numerous bubbles of air produced by air supply means not shown, and then is taken out as gypsum (a by-product).

Meanwhile, inside the gas-outlet duct 8, the mist in the treated gas B is captured by the mist eliminator 9, caused to flow into a drain hopper 8b formed at the bottom 8c of the duct body 8a, and is returned to the tank 2. The mist eliminator 9 is usually equipped with a nozzle (not shown) which sprays wash water against an element of the eliminator, and the washings too are allowed to flow down through the drain hopper 8b into the tank 2 for reuse as a part of the absorbent slurry S.

FIG. 3 shows another arrangement (of essential components) of a prior art wet flue-gas desulfurization system disclosed in Japanese Utility Model Provisional Publication No. 62-130719. Parts like those shown in FIG. 2 are designated by like numerals. In this system the mist eliminator 15 is suspended from the ceiling of the tank 2 toward the liquid surface of the absorbent slurry S and is joined at the lower end to a partition plate 16 which in turn extends partly into the bath of the slurry. The treated gas is freed from mist as it passes between the liquid surface of the absorbent slurry S and the ceiling 4, and the captured mist and washings are directly flown down into the bath inside the tank 2.

The wet flue-gas desulfurization system of the construction shown in FIG. 2 requires the drain hopper 8b and piping for connecting the hopper to the tank 2. This presents a shortcoming of additional cost for the complex construction. Another disadvantage is the high maintenance cost with frequent cleaning for the removal of said deposits (gypsum and the like in this case) from the bottom 8c of the gas-outlet duct. The duct body 8a of the gas-outlet duct 8 cannot have a fairly large diameter for cost reason. Accordingly, the cross sectional area of the gas flow path is limited and the flow velocity increased, for example, to about 18 meters per second. Thus a large mist removal capacity cannot be secured, and the mist concentration on the outlet side of the mist eliminator 9 (the final mist concentration in the treated flue gas) can hardly be lowered.

The wet flue-gas desulfurization system of FIG. 3 is simpler in construction without the need for the drain hopper and associated parts. However, the difficulty in lowering the outlet mist concentration is more serious. Increasing the height of the ceiling 4 of the tank 2 from the bath level would entail various drawbacks; for instance, it would call for a taller absorption column 1 with more component parts at extra cost and a greater lift of the circulating pump 3 would boost the power consumption. For these reasons the ceiling 4 has to be kept low, with the consequences that the cross sectional area of the flow path between the ceiling 4 and the bath surface decreases and the velocity of gas flow through the path increases, for example, to from 6 to 10 m/s, thereby reducing the mist-collecting capacity of the mist eliminator 15 accordingly. Furthermore, because the mist eliminator 15 is installed close to the region where the absorbent slurry S issued from the header pipe 10 falls down, the mist load at the inlet of the mist eliminator 15 is very heavy (i.e., the mist concentration immediately upstream of the mist eliminator 15 is very high). This, as a result, poses still another problem of a substantially high outlet mist concentration.

SUMMARY OF THE INVENTION

The present invention has for its object the provision of a wet flue-gas desulfurization system which is simpler in construction and yet is capable of attaining by far the lower outlet most concentration than the prior art systems and which, moreover, is easy to maintain.

The above object is realized, in accordance with the present invention, by a wet flue-gas desulfurization system including an absorption column formed with a tank at the bottom which is supplied with an absorbent slurry and a circulating pump for forcing the slurry upwardly from the tank into the flue gas inlet at the top of the column for contact with flue gas, wherein sulfur dioxide is removed by absorption with the absorbent slurry from the flue gas introduced in the flue gas inlet and the treated gas free of sulfur dioxide is discharged through a gas-outlet duct formed to rise integrally from the top of an end part of the tank, characterized in that a mist eliminator which is held upright, like a vertical partition, across the riser of the duct, with the lower end of the eliminator being extended partly into the bath of the absorbent slurry inside the tank.

Under the invention, the mist eliminator is installed vertically, like a partition, across the riser of the gas-outlet duct, and therefore its flow path is by far the larger in cross sectional area than the eliminators of the prior art, with a remarkable increase in the mist-collecting capacity. In addition, because the mist eliminator is located relatively remotely from the point where the spray of the absorbent slurry S forms the mist, the mist load on the inlet of the eliminator can be relatively light and the outlet mist concentration strikingly low. The flue gas passing through the duct body of the gas-outlet duct being already free from mist, there occurs no solids deposition on the bottom of the duct body. Further, because the lower end of the mist eliminator is extended to be partly submerged in the bath of absorbent slurry in the tank, the captured mist and washings are allowed to flow down directly into the tank, dispensing with a drain hopper or other structural means.

DETAILED DESCRIPTION OF PREFERRED EMBODIMENTS

Figure 1:
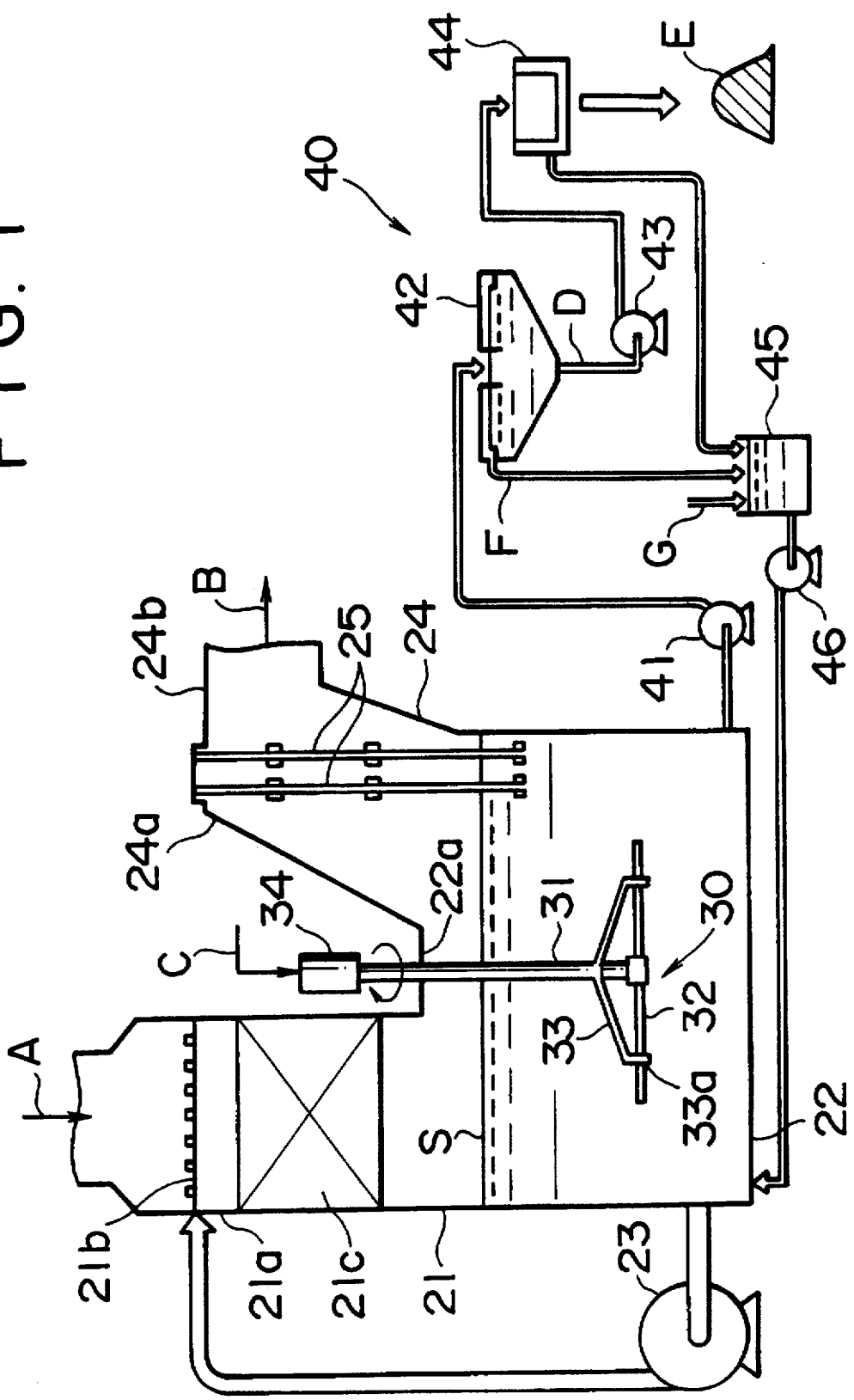
FIG. 1 is a schematic illustration of a wet flue-gas desulfurization system embodying the present invention.

The present invention will now be described with reference to FIG. 1 showing an embodiment thereof. The invention is shown here as applied to a so called oxidation in tank type wet lime-gypsum desulfurization system. It basically comprises: an absorption column 21 equipped with a header pipe 21b in a flue gas inlet 21a formed in the upper part and which is also equipped with a bed of packing material 21c; a tank 22 formed integrally with the bottom of the absorption column 21 and which is supplied with an absorbent slurry (e.g., a slurry containing a calcium compound such as limestone); a circulating pump 23 for forcing the slurry S from the tank 22 into the header pipe 21b; a gas-outlet duct 24 formed to rise integrally from the top of an end part of the tank 22 and extend sideways; and a mist eliminator 25 (mist separator) mounted as partitions across the riser 24a of the gas-outlet duct 24. It further comprises an air supply means 30 of an arm-rotating type for agitating the slurry S in the tank 22 while, at the same time, efficiently supplying the tank 22 with air (oxygen) and a gypsum-separating, absorbent-supplying means 40 for separating and taking out gypsum solids as a by-product from the slurry S in the tank 22 and supplying a fresh absorbent to the tank 22 through the reuse of the water separated from the solids.

The mist eliminator 25 consists of mesh-type elements to capture mist from the treated flue gas and frames to hold the elements. Each element is held to fill up the entire cross section of the riser 24a of the gas-outlet duct 24 and extend at the lower end to be partly submerged under the liquid surface of the slurry S in the tank 2. The mist eliminator 25 is provided with nozzles (not shown) for directing wash water against the elements so that the elements are cleaned with the sprays of water at proper intervals.

The air supply means 30 comprises an agitating bar 32 which is suspended by a hollow rotating shaft 31 inside the tank 22 and is turned horizontally by a motor not shown; air supply pipes 33 attached to the hollow rotating shaft 31, with their open ends 33a protruding downwardly below the agitating bar 32; and a rotary joint 34 connecting the base end of the hollow shaft 31 to an air source.

While air C is being forced through the rotary joint 34 into the hollow rotating shaft 31, the shaft is rotated to supply air C from the air supply pipes 33 to the vapor phase regions being formed in the trailing side of the agitating bar 32. The rear end portions of the vapor phase regions are torn into tiny pieces by vortical forces that result from the turning of the agitating bar 32, and numerous fine air bubbles of substantially uniform size are produced.

The gypsum-separating, absorbent-supplying means 40 comprises a slurry pump 41 for taking out the slurry S from the tank 22, a thickener 42 for concentrating the slurry S so taken out, another slurry pump 43 for discharging the concentrated liquid D from the thickener 42, a solid-liquid separator 44 for separating gypsum E from the concentrated liquid D, a filtrate tank 45 in which the supernatant water F from the thickener 42 and the filtrate from the solid-liquid separator 44 are collected, and a slurry pump 46 for supplying the tank 22 with a fresh absorbent slurry S prepared by adding limestone G to the liquid in the filtrate tank.

Now the operation of the wet flue-gas desulfurization system of the above-described construction will be explained. The absorbent slurry S that has been supplied to the tank 22 is forced up by the circulating pump 23 to be sprayed upwardly from the header pipe 21b. The spray comes in contact with a crude flue gas A being introduced into the flue gas inlet 21a, and removes sulfur dioxide by absorption from the flue gas. The absorbent slurry S sprayed from the header pipe 21b and now flowing down, absorbing sulfur dioxide, through the bed of packing material 21c reaches the bath in the tank 22, where it is stirred by the agitating bar 32 and is oxidized through contact with the numerous air bubbles that have resulted from the afore-described tearing phenomenon. This oxidation is followed by a neutralization reaction, which produces gypsum.

Thus gypsum and a small proportion of lime as the absorbent are suspended inside the tank 22. They are drawn out by the slurry pump 41 into the thickener 42, from which the concentrated liquid D is sent by the slurry pump 43 to the solid-liquid separator 44. In the separator the liquid is filtered and is taken out as a gypsum E with a small water content (usually about 10% water). Meanwhile the supernatant water F from the thickener 42 and the filtrate from the solid-liquid separator 44 are both sent to the filtrate tank 45, and thence, with the addition of limestone G, the mixture is returned as a fresh absorbent slurry S to the tank 22.

The treated gas B, freed from sulfur dioxide, passes through the space between the ceiling 22a of the tank 22 and the liquid surface of the slurry S. It is then discharged through the duct body 24b of the gas-outlet duct 24. Before the eventual release of the gas, the mist eliminator 25 in the riser 24a of the duct 24 captures mist efficiently and allows the gas to be discharged with a very low final mist concentration.

Since the mist eliminator 25 is fitted vertically, like a partition, across the riser 24a of the gas-outlet duct 24, its flow path is by far the larger in cross sectional area than the eliminators of the prior art. The flow rate of the gas in that region is correspondingly low (e.g., about 4.5 m/s), and the mist-collecting capacity of the mist eliminator 25 is markedly improved over the prior art. In addition, because the mist eliminator 25 is installed relatively remotely from the point where the spray of the absorbent slurry S forms the mist, much of the mist falls by gravity onto the bath surface region upstream of the mist eliminator 25, and the mist load on the inlet of the eliminator is relatively light. This permits designing the system to have a strikingly lower mist concentration in the treated gas B than heretofore at the outlet of the mist eliminator.

Figure 2:
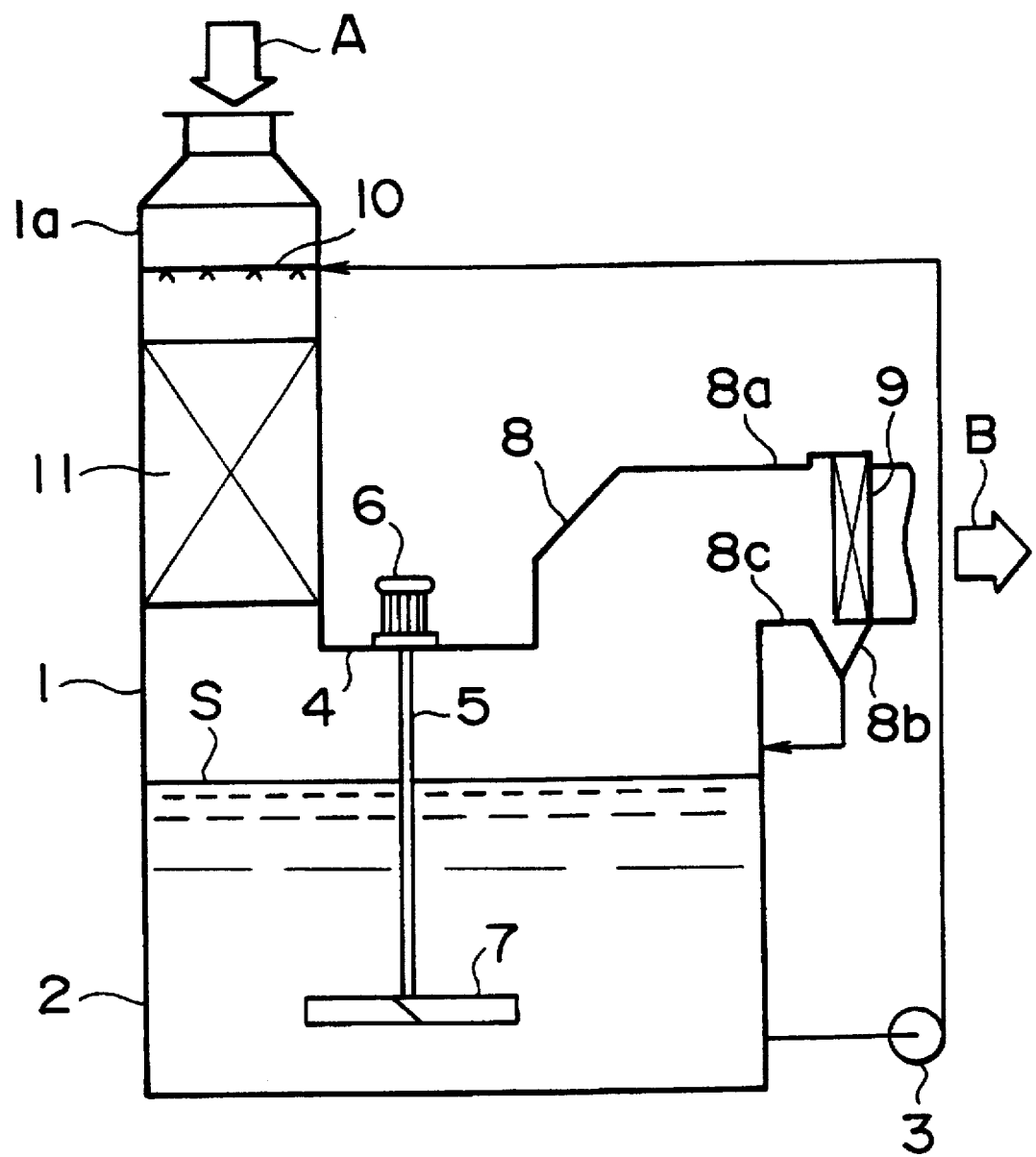
FIG. 2 is a schematic view of the essential parts of a wet flue-gas desulfurization system of the prior art.
Figure 3:
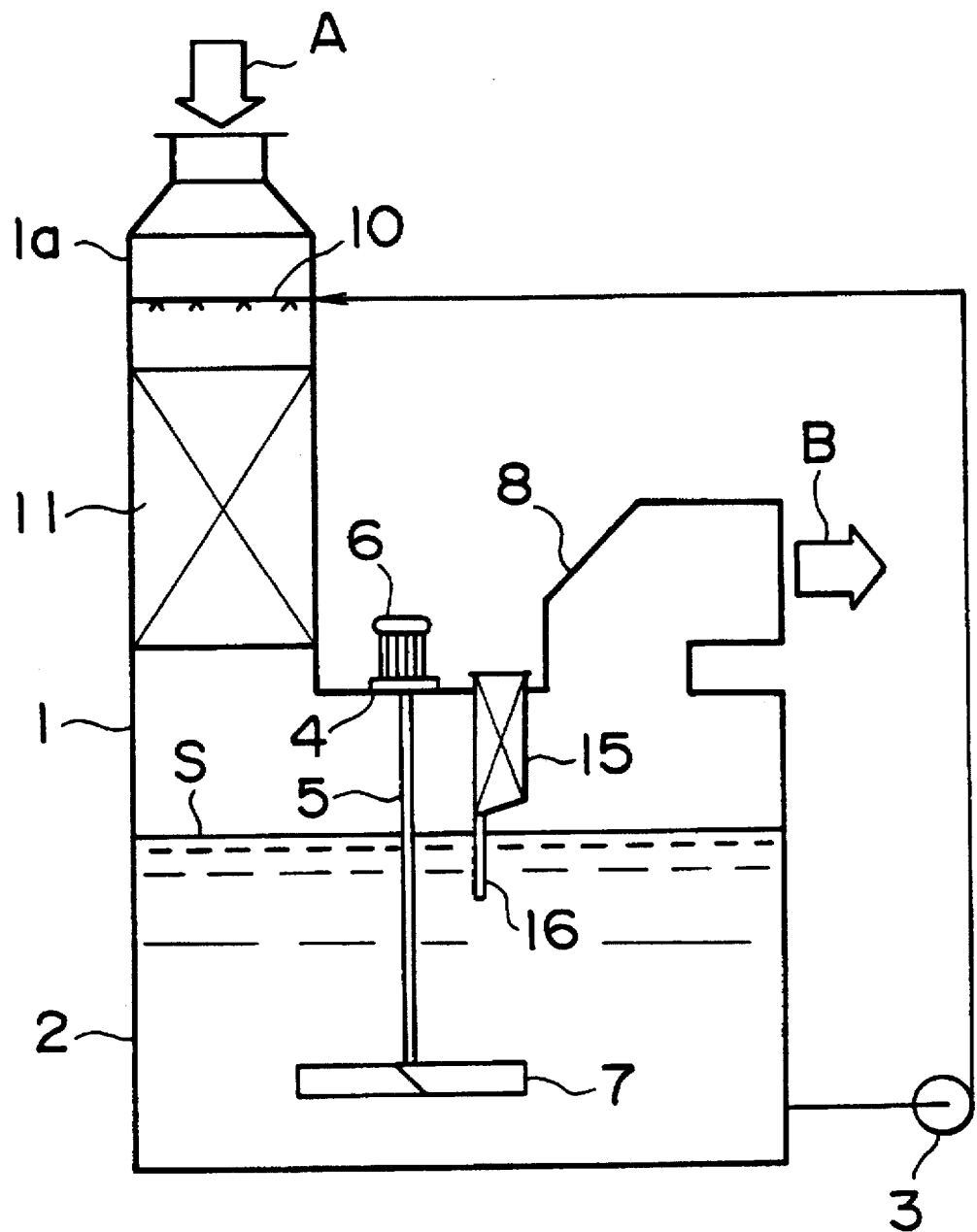
FIG. 3 is a schematic view of the essential parts of another prior art wet flue-gas desulfurization system.

The mist captured by the mist eliminator 25 and the wash water sprayed over the eliminator flow down along the eliminator itself into the tank 22, where they are reused as part of the absorbent slurry. There is no need for a drain hopper or the like as with the conventional system shown in FIG. 2. In the duct body 24b of the gas-outlet duct 24, where the mist-free gas passes, no deposition of solids on the bottom takes place.

During operation the sulfur dioxide concentration in crude flue gas, pH of the slurry in the tank, and other variables may be monitored with sensors (not shown) to maintain a high rate of desulfurization and high gypsum purity. On the basis of the measured values the supply of limestone G, spray volume of wash water for the mist eliminator 25, etc. are suitably regulated by controls not shown.

With the wet flue-gas desulfurization system of the invention thus far described as an embodiment thereof, it is possible to reduce the inlet mist load and remarkably increase the mist-collecting capacity of the mist eliminator 25, and thereby substantially reduce the outlet mist concentration. Also, the maintenance cost is saved by precluding the deposition of solids on the inner walls of the duct body 24b of the gas-outlet duct 24. Furthermore, the equipment cost too is reduced because the direct downflow of captured mist and washings into the tank makes it no longer necessary to use a drain hopper or other structural modifications.

The present invention is not limited to the embodiment described above but may be otherwise variously embodied. For example, it may be applied, apart from the lime-gypsum process desulfurizer thus far described, with equal utility to other desulfurization systems, such as of the caustic soda and magnesium hydroxide processes using caustic soda and magnesium hydroxide, respectively, as the absorbent. The oxidation method is not limited either to the air supply means of the arm rotating type as in the foregoing embodiment; it may of course be replaced by a unit injecting air for oxidation from below the bottom of the tank through a piping or by a separate oxidation process using an oxidation column independent of the tank of the absorption column.

According to the present invention, as has been explained hereinabove, the inlet mist load is decreased and the mist-collecting capacity of the mist eliminator is strikingly increased to realize a substantial lowering of the outlet mist concentration. In addition, the maintenance cost is reduced by preventing the deposition of solids on the inner walls of the duct body of the gas-outlet duct, and the equipment cost also is reduced by the direct introduction of captured mist and washings into the tank, dispensing with the need for a drain hopper or the like.

We claim:

1. A wet flue-gas desulfurization system comprising an absorption column, a tank formed integrally with the bottom of the absorbent column to hold an absorbent slurry, a flue gas inlet formed at the top of the absorption column, a circulating pump for forcing the slurry upwardly from the tank into the flue gas inlet for contact with flue gas, means for removing sulfur dioxide by absorption from the flue gas through the medium of the absorbent slurry in the flue gas inlet, and a gas-outlet duct formed to rise integrally from the top of an end part of the tank, whereby the treated flue gas free from sulfur dioxide is discharged to the outside, said gas-outlet duct including a mist eliminator which is held upright, as a vertical partition, across the riser of the duct, with the lower end of the eliminator being extended partly into the bath of the absorbent slurry inside the tank.

2. The system as claimed in claim 1 which is a lime-gypsum process desulfurization system.

3. The system as claimed in claim 1 which is a caustic soda process desulfurization system using caustic soda as the absorbent.

4. The system as claimed in claim 1 which is a magnesium hydroxide process desulfurization system using magnesium hydroxide as the absorbent.

* * * * *